Fig.1

March 6, 1945.   O. W. FISHER ET AL   2,371,040
APPARATUS FOR WEIGHING A STREAM OF VARYING QUANTITY OF MATERIAL
Filed Sept. 15, 1942   5 Sheets-Sheet 2

INVENTORS
ORIN WALLACE FISHER
FRANK J. WHITE
HARLAN BETTS WEATHERSTONE
BY Arnold & Mathis
ATTORNEYS March 6, 1945. O. W. FISHER ET AL 2,371,040
APPARATUS FOR WEIGHING A STREAM OF VARYING QUANTITY OF MATERIAL
Filed Sept. 15, 1942 5 Sheets-Sheet 4

INVENTORS
ORIN WALLACE FISHER
FRANK J. WHITE
HARLAN BETTS WEATHERSTONE
BY Arnold & Mathis
ATTORNEYS

Fig. 6

INVENTORS
ORIN WALLACE FISHER
FRANK J. WHITE
HARLAN BETTS WEATHERSTONE
BY Arnold + Mathis
ATTORNEYS Patented Mar. 6, 1945

2,371,040

UNITED STATES PATENT OFFICE 2,371,040

APPARATUS FOR WEIGHING A STREAM OF VARYING QUANTITY OF MATERIAL

Orin Wallace Fisher, Frank J. White, and Harlan Betts Weatherstone, Seattle, Wash., assignors to Fisher Flouring Mills Co., Seattle, Wash., a corporation of Washington Application September 15, 1942, Serial No. 458,440

6 Claims. (Cl. 265—28)

Our invention relates to the method of determining and recording the weight of a stream of material of varying weight moving over a scale beam, or determining the weight of units of material of varying weight.

More particularly, our invention relates to the method of determining and recording the weight of a stream of material of varying weight moving over a scale beam, or units of material of varying weight, said method and means being characterized by weighing while maintaining the scale beam in null position by an electromagnetic force which is directly proportional to the unknown force (i. e., the weight) tending to actuate the beam from null position, and indicating said varying weight and, if desired, totalizing said weight of said stream or plurality of streams.

For purposes of illustration and definiteness and clarity of description, our invention will be set forth as specifically applied to a flour mill and the problems inherent in the milling operation therein. In milling flour it is important to weigh the varying constituent streams of material into which the wheat may be resolved, but it is to be particularly noted that our invention is not to be restricted to any such specific application, and the application thereof is coextensive with all uses where the same or like problems and conditions obtain in whole or in part.

Without in any way limiting the scope of the foregoing, the following may be added: It is obvious that instead of weighing the constituent elements into which a product may be divided, it may be important, where the reverse is the situation, to weigh the streams of materials which are to be compounded or joined together in order to form a given product. Our invention is also applicable to such situations. Also, our invention is applicable to determining and recording pressures and temperatures.

In milling flour the object is to remove the endosperm (i. e., the flour producing inner portion) from the bran covering and the germ constituents of the wheat kernel. A kernel of wheat in general yields several mill products—flour and offal. Wheat flour represents about 75 to 70% of the grain under conditions of commercial milling, and is formed of (1) patent flour, which is made only from the highly refined and purified endosperm, or inner portion of the wheat kernel, (2) first clear, and (3) second clear. The offal, which ordinarily amounts to about 25 to 30% of the grain under conditions of commercial milling, comprises: (1) bran, which is the coarse flaky part of the wheat coating, (2) shorts, made up of fine bran, germ meal, etc. and (3) red dog, more flour-like, but still containing much of the fibrous material from the outer layers of the wheat berry.

The amount of flour yield possible to obtain from a given lot of wheat depends (1) on the potential yield in the wheat and (2) the milling procedure. Obviously only the second is directly under the control of the miller. The complicated milling process includes the steps of breaking and grinding to the required fineness and the grading, bolting and separating of the fibrous outer covering from the inner portion, or white flour center of the wheat kernel. Thus, milling provides varying streams of flour. Perhaps the greatest contributing factor in the variation of yields is the division of work between the break rolls. Accordingly, it is imperative that the miller should know the weight of the streams of the constituent products of the wheat at all times, i. e., at any given instant during the milling operation, in order to know whether the mill is operating at a maximum efficiency, in contrast with waiting until the end of a relatively extended period of milling, as at the end of a shift, when a considerable quantity of flour has been produced and the offal has been sacked. If the miller knows at any instant during the milling operation the relative value of the various streams, he may prevent the mixing of the flour yielding endosperm with the portion which may he separated, stored, or placed in containers as a part of the offal. In some mills the practice heretofore has been to check up at the end of a period of time, such as eight hours, but the results learned are after the flour has been lost due to its non-separation from the offal, the offal having been packed in containers, and it would involve too great expense to recover the flour therefrom. Likewise, from the point of view of quality it is important that the miller should know promptly and at all times, i. e., at any given instant during the milling, the quality and quantity of the flour from the point of view of its uniformity. Due to the exacting requirements of modern baking, the flour must be uniform because every stage of the baking procedure is based definitely on time and temperature. Uniformity has now become a critical factor in milling flour.

Some mills in recent years have adopted a sieve test method, known as granulation control, for controlling the distribution of work between different breaks. This test likewise has the objection that it can be made only periodically and does not show the developments in the mill from instant to instant.

The invention, as herein illustrated, is employed in connection with the weighing of the finally separated streams of material, but it is obvious that it may be desired also to use the same in connection with streams at earlier stages in the milling process.

Among the primary purposes of our invention is to provide weight determining means which, (a) will show the quantity of material flowing in a given stream at any instant, (b) will record or make a permanent record of the variation in quantity of that stream, and, (c) will record or totalize the quantity of material that has passed through in any given period of time, and totalize the totals of a plurality of the streams.

So far as known to the applicants, there is no scale means employed to achieve the objects herein set forth. To the prior art weighing means as commonly designed and employed for other installations and purposes, there are serious objections when it is attempted to adapt them to perform the functions herein described. Such scales do not operate on the principle of determining the weight when the scale beam is in null position with the current on at such time, but weigh on the principle of determining the degree of departure of the scale beam from null position. We have discovered after extended experimentation and experience that it is necessary for the purposes herein described to have the current flowing when the beam is in null position, and the amount of this current is utilized to meter the weight of the product passing through the scale and to record such weight. More particularly, applicants provide by their invention for determining the weight of the given continuously moving stream of material while maintaining the scale beam in null position by an electromagnetic force, preferably dampened, which is directly proportional to the unknown force, (the weight of the material then momentarily on or passing over the scale beam), tending to actuate the beam from null position. This, in turn, gives a straight line relationship between the force restoring the scale beam to null position and the weight moving the beam from null position, or, in other words, the two forces are directly proportional. This, in turn, makes the step possible of totalizing the weights of materials of a plurality of streams moving through a plurality of scale beams.

Also, we accomplish our results without employing electrical contact points which are objectionable because they are subject to becoming coated and too abrupt in action. Contact points are subject to corroding, sparking, wearing and becoming unreliable. Electric sparking in a flour mill, with dust in the air, becomes a very serious explosion and fire hazard.

Also, prior art devices frequently have links or springs which cause drag or become bound with dirt. Further, such prior art devices often employ switches which ordinarily introduce factors of uncertainty. Predetermined rate feeding mechanisms are objectionable for the purposes of our invention generally for one or more of the reasons noted above and are not suitable for use to weigh flowing streams of material varying as to weight because such feeding means require a hopper reservoir to provide for the accumulation of material. In opposition to this, our problem involves the weighing of a stream of material while moving and without any reservoir, as it must be weighed as fast as it comes from the milling operations. Furthermore, the principle upon which a feeder mechanism operates is unsuited for the purposes herein set forth because a feeder is essentially set or adjusted for a predetermined rate of material, and the weight factor, which it is our purpose to determine, continuously varies under conditions set forth. In contrast with mechanism set or adjusted to weigh in each operation a definite weight of material our invention, including its circuits, is adapted not only to weigh from zero to the anticipated maximum, but even beyond such maximum up to the full range of the mechanism. In short, the control parts of our invention are adapted to determine weights greater than the anticipated maximum.

Among our primary objects is to provide a method of weighing and scale means therefor for achieving the results set forth herein and to provide a method of weighing and recording and a scale mechanism therefor which reliably and accurately reveals, at all times, i. e., from moment to moment, the weight of material constituting one or more streams, which material may be constantly varying in weight, or the weight of units of material of varying weight, all as more fully described herein.

The above mentioned general objects of our invention, together with others inherent in the same, are attained by the mechanism illustrated in the following drawings, the same being preferred exemplary forms of embodiment of our invention, throughout which drawings like reference numerals indicate like parts.

Referring to Figures 1, 2, 3, and 4, the various streams of constituent products of the wheat berry may be passed over a plurality of scales, such as scale 20 for patent flour, scale 21 for first clear, scale 22 for second clear, scale 23 for bran, scale 24 for shorts, and scale 25 for red dog. As these scales may be of the same character, we will now describe one of such scales—for example, scale 21.

Figure 1:
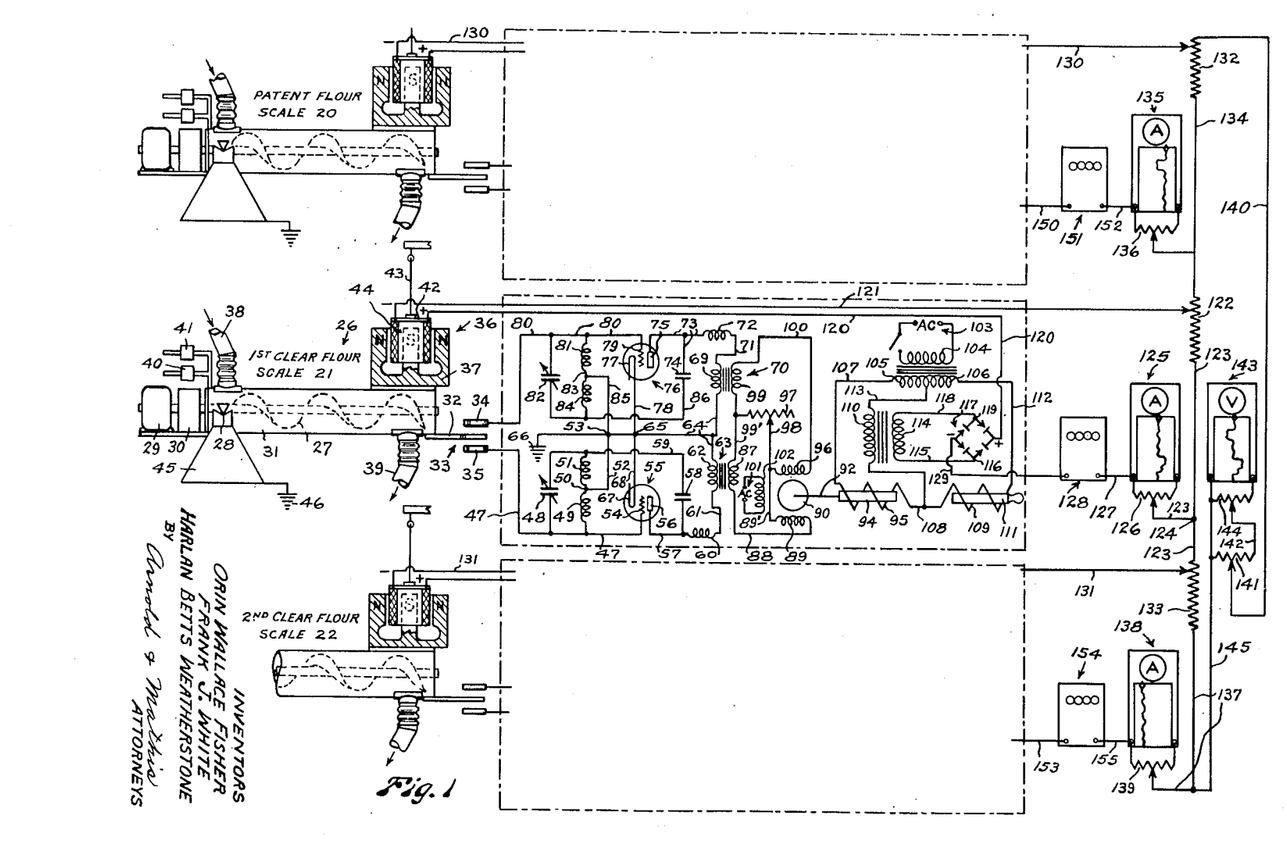
Figure 1 is a view of an embodiment of our invention showing a side elevation view partly in longitudinal section of the scale beam having a screw conveyor, a linking means in the form of a plate condenser located between said scale beam and a balanced tuned control circuit, one form of a linking means, as a motor, disposed between the controlled circuit and a regulating power circuit, for providing an electromagnetic force to restore and maintain the scale beam in null position, and an indicating and totalizing meter means.

A scale beam 26, Fig. 1, having a screw conveyor 27 is mounted on fulcrum 28, the beam having a constant speed motor 29 connected through a speed reduction means 30 to said conveyor 27 in order to cause material to move through said conveyor at a uniform speed, though varying in quantity and therefore in weight from zero to maximum run. Said conveyor 27 is operatively disposed in a housing 31 which carries one plate 32 of a condenser unit 33 having also fixedly mounted plates 34 and 35. Thus is provided an electrical and non-physical linking means between the scale beam and the control circuit herein below described. Also mounted on said housing is a polarized magnetic balancing means 36 of dynamic loud speaker type which preferably may have one element 37 in the form of a permanent magnet. In the housing 31, a bellowed inlet 38, for the admission of material to be weighed, is preferably located in the vertical axis of the fulcrum and for the discharge of said material from said conveyor a bellowed outlet 39 is provided. A counter-balance 40 is attached to said housing for mechanically balancing the beam when there is no material flowing through the beam 26, that is, for bringing the scale beam into null position. A second counter-balance 41 is provided for mechanically check weighing material while in the act of flowing through scale beam 26.

A second element 42, as an electromagnet, of the polarized magnetic balancing means 36 is operatively disposed with respect to said first magnetic element 37 of balancing means 36, preferably by suspending the same by wire 43 so that the two elements 37 and 42 will be mutually physically independent of each other and freely mounted without any physical contact between them to produce friction when relative movement occurs therebetween. Element 42 is preferably an electromagnetic means and is preferably formed with the wire wound upon a non-magnetic metal spool 44, (Fig. 1) so as to dampen or oppose quick jerky relative movement between elements 37 and 42 in order that a relatively smooth and readable recording curve may be produced. The base 45 supporting the fulcrum 28 is grounded at 46.

A circuit herein designated a control or governing circuit comprising two symmetrical components is provided as follows: Condenser plate 35, Fig. 1, is connected by conductor 47 to one side of variable condenser 48. Also conductor 47 is connected to inductance coil 49, which in turn is joined by conductor 50 to inductance coil 51, said coils being inductively related. Conductor 52 connects conductor 50 to junction point 53. Also conductor 47 is connected to grid 54 of tube 55. Tube plate 56 is connected by conductor 57 to one side of condenser 58, while the other side is connected by conductor 59 to inductance coil 51 and to the other side of condenser 48. Conductor 57 is also connected to choke coil 60, which is connected by conductor 61 to secondary winding 62 of transformer 63. Secondary 62 is connected by conductor 64 to junctions 65 and 53 and to ground 66. Junction 65 is joined to cathode 67 by conductor 68.

Conductor 64 extends to secondary winding 69 of transformer 70. Conductor 71 joins winding 69 to choke coil 72, which is connected by conductor 73 to one side of condenser 74 and to plate 75 of tube 76, the cathode 77 of which is joined by conductor 78 to junction 65. Grid 79 is joined by conductor 80 to inductance coil 81 and to one side of variable condenser 82 and also to plate 34. Coil 81 is joined by conductor 83 to inductance coil 84, said coils being inductively related. Conductor 83 is joined by conductor 85 to junction 53. The other side of condenser 74 is connected by conductor 86 to inductance coil 84 and variable condenser 82.

Figure 2:
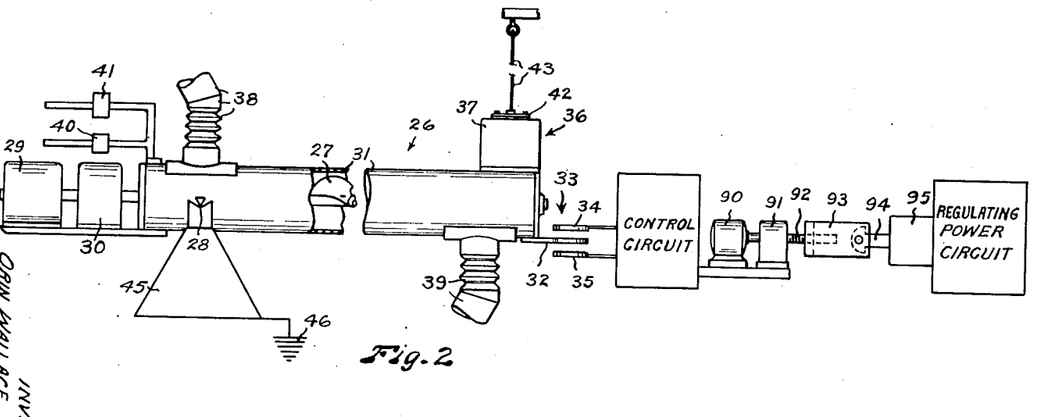
Fig. 2 is a view in side elevation of the scale beam embodying our invention in the form of a screw conveyor, showing a side elevation view of the linking means in the form of a plate condenser located between the scale beam and the controlled circuit, and a side view of the motor linking means disposed between the controlled circuit and the regulating power circuit, said circuits being shown schematically or diagrammatically.
Figure 3:
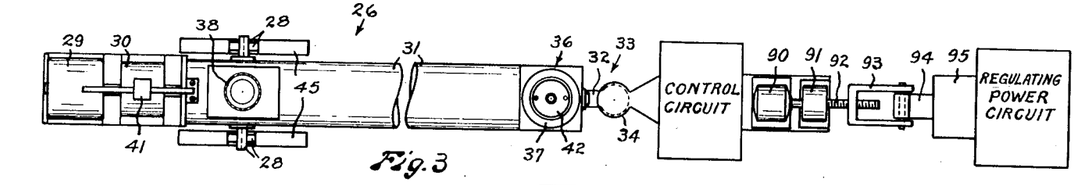
Fig. 3 is a planned view of the mechanism shown in Fig. 2.

Primary winding 87 of transformer 63 is connected by conductor 88 to one of the shaded pole secondary windings 89 of a reversible type of motor 90 having speed reduction gearing 91, Figs. 2 and 3, the screw 92 threadedly connected to yoke 93 which is pivotally connected to core 94 of solenoid coil 95, Fig. 1, said motor and its associated parts forming the mechanical linking means between the control circuit and the regulating power circuit hereinafter described, and constituting a mechanical control for said regulating power circuit. Also secondary winding 89 is joined by conductor 89' to secondary winding 96.

We prefer to employ as motor 90, a reversible type of motor having wound shaded poles so that among other purposes, there are no contact points so that danger from explosion in the dust or flour laden air of the mill is minimized. We prefer the motor to have a differential action so that the motor speed and direction may vary according to the difference in the excitation of the shaded poles.

The other shaded pole secondary winding 96 of said motor is connected to adjustable resistance 97 by conductor 98 and to primary winding 99 by conductor 100. Primary winding 87 is joined to adjustable resistance 97 and primary winding 99 by conductor 99'. An alternating current with source 101 is impressed upon primary winding 102 of motor 90.

A regulating power circuit for energizing the electromagnetic means 36 is provided as follows: An alternating current supply with source 103 is connected to the primary transformer winding 104 which is inductively disposed with respect to secondary winding formed of two components 105 and 106. Conductor 107 connects winding 105 to solenoid coil 95 in which is movable core 94 connected to motor 90 for moving said core 94 in and out of the coil 95. Solenoid coil 95 is connected by conductor 108 to solenoid coil 109 and transformer primary 110. In solenoid coil 109 is an adjustably disposed core 111. This core 111 is not connected to motor 90 for movement in and out of its solenoid coil, but functions as an adjusting means in effecting a balance between the circuits in which said solenoids 95 and 109 are located. Solenoid 109 is connected to the secondary winding 106 by conductor 112. Primary winding 110 is connected by conductor 113 to an intermediate point of secondary winding formed of the two components 105 and 106. Secondary winding 114 is connected by conductor 115 to one alternating current terminal 116 of a rectifier 117. Secondary winding 114 is also connected by conductor 118 to the other alternating current terminal 119 of the rectifier 117. Conductor 120 connects positive terminal of the rectifier 117 to one terminal of the element 42 of the polarized magnetic balancing means or unit 36. Conductor 121 connects the other terminal of the element 42 to adjustable resistance 122 and conductor 123 joins resistance 122 to the junction point 124 and adjustable resistnace 133 and to ammeter 125, through its shunt 126. Ammeter 125 is connected by conductor 127 to ampere hour meter 128 and conductor 129 connects the ampere hour meter 128 to the negative terminal of the rectifier 117.

Figure 4:
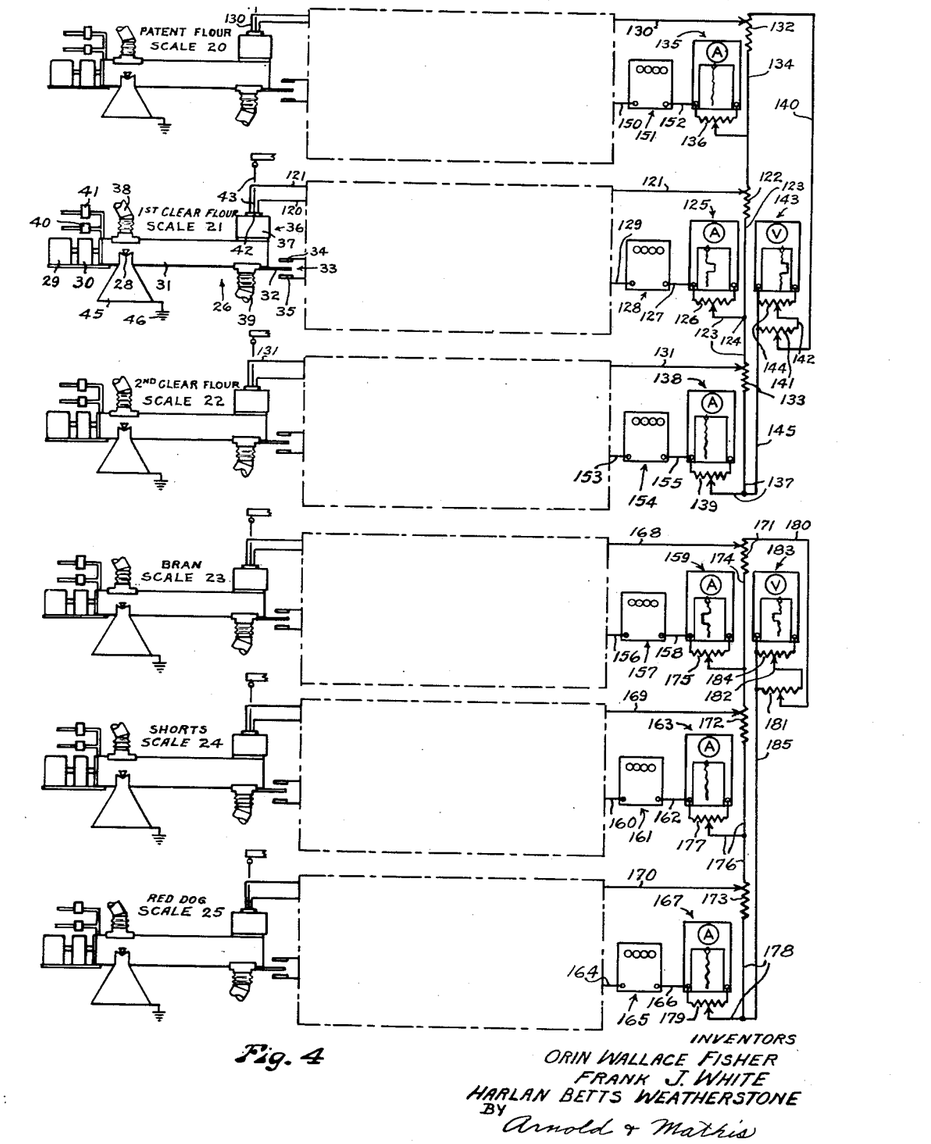
Fig. 4 is a view of six scales for weighing material constituting six streams of constituent parts of wheat together with the associated circuits and recording means for said weights, said circuits and recording means being shown diagrammatically in part.

Scale 20 has conductor 130, corresponding to conductor 121 of scale 21 and conductor 131 of scale 22, connecting with adjustable resistance 132 as does 131 with resistance 133. Conductor 134 connects resistance 132 to ammeter 135 through shunt 136 and to resistance 122. The meters of the several scales are calibrated the same as described for the similar or corresponding meters of scale 21. Resistance 133 is connected by conductor 137 to ammeter 138 through its shunt 139. Resistance 132 is connected by conductor 140 to adjustable resistance 141, which in turn is connected by conductor 142 to totalizing volt meter 143 through its shunt 144. Volt meter 143 is connected by conductor 145 to shunt 144, adjustable resistance 141 and to conductor 137.

Scale 20, similar to scale 21, has the conductor 150 extending from the negative terminus of its rectifier corresponding to rectifier 117 of scale 21 to the ampere hour meter 151 which in turn is connected by conductor 152 to ammeter 135, an likewise scale 22 has conductor 153 connecting the negative terminal of its rectifier corresponding to rectifier 117 to ampere hour meter 154 which in turn is connected by conductor 155 to ammeter 138.

The recording parts of scales 23, 24, and 25 weighing the offal products, bran, shorts, and red dog respectively, are described as follows:

Scale 23 has conductor 156 extending from the negative terminal of its rectifier corresponding to rectifier 117 of scale 21 extending to ampere hour meter 157 which in turn is connected by conductor 158 to ammeter 159.

Likewise scale 24 has conductor 160 extending from the negative terminal of its rectifier corresponding to rectifier 117 of scale 21 to ampere hour meter 161 which in turn is connected by conductor 162 to ammeter 163.

Likewise scale 25 having conductor 164 extending from its rectifier corresponding to rectifier 117 of scale 21 to ampere hour meter 165 which in turn is connected by conductor 166 to ammeter 167.

Scales 23, 24, and 25, have conductors 168, 169 and 170 corresponding to conductor 121 of scale 21 connecting with adjustable resistances 171, 172 and 173 respectively. Conductor 174 connects resistance 171 to ammeter 159 through shunt 175 and to resistance 172.

Resistance 172 is connected by conductor 176 to ammeter 163 through its shunt 177. Resistance 173 is connected by conductor 178 to ammeter 167 through its shunt 179. Resistance 171 is connected by conductor 180 to adjustable resistance 181, which in turn is connected by conductor 182 to totalizing volt meter 183 through shunt 184. Totalizing volt meter 183 is connected by conductor 185 to shunt 184, adjustable resistance 181 and to conductor 178.

The mode of operation of our invention is as follows: Flour from the mill enters the scale through flexible inlet 38 as a flowing stream varying from zero to a maximum load. Entering in the axis of the fulcrum 28 the impact of the stock falling over the pivot point does not interfere with the accuracy of the scale. Thus impact effect is eliminated. Synchronous speed motor 29 is connected to screw conveyor 27 through speed reduction gear 30, and thus the conveyor discharges the stock through flexible outlet 39. In this form of our invention the scale beam constitutes a part of the conveyor or channel means of the material.

Without any material in the scale, the scale beam 26 is adjusted mechanically by slider weight 40 to null position so that condenser plate 32 is midway between condenser plates 34 and 35. Also, slider weight 41 is set on zero position. In such position, the current on both sides of the control circuit is impressed in balanced relation upon the secondary windings 89 and 96 of the reversible motor 90. Thus, this motor 90 remains at rest, and when at rest the current output of the regulating power circuit is at zero so that there is no magnetic force developed in the polarized magnetic unit 36, i. e., no restoring force to move the beam 26 into null position.

The control circuit, being formed of two symmetrical components each of which includes a high frequency oscillating tuned or tank circuit, and motor fields is adjusted so that each component is in balanced relation with the other when plate 32 is in null position with respect to plates 34 and 35. Transformers 63 and 70 constitute respectively coupling means between the oscillating circuits having tubes 55 and 76, and secondary windings 89 and 96 of reversible motor 90. Also said transformers 63 and 70 function as saturable reactors for definite motor speed control. The control circuit governs the motor 90, both as to direction in, and the speed with, which it turns.

The regulating power circuit has a bridge circuit, and therefore has two sides which may be brought into balanced relation—one side or branch of the bridge comprising solenoid coil 95 and winding 105, the other side or branch comprising solenoid 109 and winding 106, and the bridge member has the primary winding 110 of a transformer, which functions as the coupling means between the bridge circuit and the rectifier circuit having rectifier 17.

Thus, without any stock in the scale beam 26, the energized control circuit and the energized regulating power circuit may all be brought into balanced null position, i. e., the invention mechanism as a whole may be brought into balance in null position mechanically and electrically.

When stock is fed to the scale beam 26, condenser plate 32 will move nearer to plate 35, thus unbalancing the tuned circuits having respectively tubes 55 and 76 so that secondary winding 62 will draw more current from primary winding 87, which in turn will draw more current from secondary winding 89, thus causing motor 90 to rotate and retract solenoid core 94. This, as core 94 is arranged with respect to the coil 95, increases the current flow in solenoid coil 95 which in turn causes current to flow from solenoid coil 95 to primary coil 110 of the bridge. The core 94 and coil 95 are so relatively physically positioned that relative movement in one direction of the core 94 as respects the coil 95 always increases current flow in coil 95 and in the other direction, always reduces the current in coil 95. As an example, outward movement of the core 94 as respects the fixed coil 95 always increases the current flow in the coil 95 while inward movement or further entrance of the core 94 into coil 95 always decreases the current flow in coil 95. The said retracting or outward movement of the core 94 increases the current in coil 95, windings 110 and 114. Current in winding 114 is rectified by rectifier 117 and causes current to energize electromagnetic element 42 of polarized magnetic unit 36 and restore beam 26 to null position, i. e., lift plate 32 so that it is so related to plates 34 and 35 that it is in null position and motor 90 comes to rest with only sufficient current flowing in the power circuit to maintain the beam 26 in null position for the quantity of stock then flowing over the scale beam 26. It will be noted that the restoring force of the polarized magnetic unit 36 is directly proportional to the weight of the material in the scale beam 26 which causes condenser plate 32 to approach condenser plate 35. Also it is to be noted that the current in conductor 120, which energizes the polarized magnetic unit 36, is likewise directly proportional to the magnetic force developed to restore condenser plate 32 to null position. The very practical beneficial result of these proportional magnetic forces and proportional current is that as the condenser plate 32 approaches null position, the restoring force is progressively decreased so that it comes to rest gradually and without being caused to overshoot or pass through null position. As it will be further explained herein, this condition is sought, developed and provided among other reasons so that the recording curve is characterized by having a smoothness due to the absence of sudden variations, which causes it to give an easily read recording curve. Much difficulty was experienced in attaining such a curve and the problem solved only after extended experimentation. The restoring force, it will be noted, is controlled by the reversing motor link 90 which operates through its reduction gear 91. In short, if plate 32 is widely dislodged from null position, (by a considerable increase of material flowing in the scale beam), then this condition immediately causes motor 90 to rapidly operate to provide increased current in conductor 120, which in turn increases the magnetic force of magnetic unit 36 to restore plate 32 to null position, and as the plate 32 approaches null position the speed of motor 90 is progressively decreased so that the result is that the rate of increase of current flowing in conductor 120 is progressively decreased. This in turn decreases the rate of increase of current in polarized unit 36, so that when the plate 32 reaches null position there is only sufficient current flowing in conductor 120 and there is only sufficient magnetic force being developed to maintain the plate 32 in null position for the material then flowing in scale beam 26—such force and current being in straight line relationship to the weight of the material. Upon the arrival of the plate 32 in null position, the motor will stop, leaving solenoid 94 in such position as to cause precisely such amount of current to flow in conductor 120 as is necessary to maintain the required magnetic force in unit 36 to keep plate 32 in null position. Thus it will be particularly noted that the rate of change of the correcting current is directly proportional to the magnitude of the displacement of plate 32 from null position.

If there is a decrease in the stock entering the scale beam 26, then condenser plate 32 will approach condenser plate 34, which will cause motor 90 to rotate in the opposite direction and cause the core 94 to enter further into solenoid core 95 and reduce, as the core 94 is arranged with respect to the coil 95, the current output of the regulating power circuit so that electromagnetic element 42 is less energized and the beam 26 moves down, i. e., carries condenser plate 32 toward condenser plate 35 until it reaches null position—all this being accomplished in a manner quite similar to that explained above for lifting the beam to null position. It will be noted that the resultant restoring force is the algebraic sum of the restoring electromagnetic force and the force of gravity.

Therefore, it is manifest that the amount of the current or amperes of current in the power circuit is delicately determined by and definitely varies directly with the weight of stock flowing in scale beam 26 for any given instant.

It is to be noted that the current is flowing in the regulating power circuit when there is stock in the scale beam 26 in order to maintain the scale beam in null position. The dampening action of the non-magnetic spool 44 of electromagnetic unit 36 and the necessity of bringing motor 90 from rest to rotating and to actuating screw 92 through the reduction gears, all operate to steady the movement of scale beam 26 and thus is avoided sudden and jerky increase or inconsequential movement of the scale beam 26—the pitch of the screw and the gears contributing as controlling means of the speed of change, and all forming a part of the mechanical control or linking means. Thus, the use of the reversing motor 90 as a coupling means between the control and power circuits is useful as a dampening means to the movement of the scale beam 26. The motor 90, employed as a mechanical coupling means between the control and power circuits or as current maintaining means, so functions as a steadying factor to the scale beam 26 since there is a time factor involved in converting electrical energy into mechanical motion and using this mechanical motion as explained to control the flow of current. In short, there is both electrical and mechanical dampening action.

Also, the scale beam is steadied in its movement because at all times when material is moving through or "over" the beam the circuits are energized which means that the beam with material thereon is always subjected to magnetic force, so that the movement of the scale beam is always the result of the resultant force derived from the lift of the electromagnetic force and the pull of gravity.

The control circuit and its linking means with the scale beam determines the degree of departure of the scale beam from null position, whereas the mechanical linking means between the control circuit and the regulating power circuit determines the current required to restore the scale beam to, and maintain the same in, null position. The linking means between the scale beam and the control circuit governs the operation of the control circuit. The control circuit in turn governs the mechanical linking means, in the case above illustrated, the motor linking means, and said linking means governs the regulating power circuit which in turn governs the electromagnetic means which in turn governs the scale beam as respects null position.

The current of the regulating power circuit passes through ampere hour meter 188 for scale 21 which is calibrated to show the total weight of stock or material passing through the scale for a given period of time, such as twenty four hours. The current of the power circuit also passes through, and is graphically recorded on a moving chart of a recording ammeter 125, which is adjusted by means of the shunt 126 and calibrated to record the rate of flow of the stock through the scale beam in pounds per minute. Thus, there is indicated the weight of stock for any given instant, or moment, passing through the particular scale 21, which weighs the first clear flour. Like recording means are provided for scale 20 for the patent flour and scale 22 for the second clear flour.

Relative totalizing volt meter 143: The total amount of stock weighed by all three flour scales 20, 21, and 22 is recorded and indicated by recording and/or indicating voltmeter 143. Each circuit, of recording ammeters 135, 125 and 138 of the scales 20, 21 and 22 respectively contributes its share of voltage in the totalizing circuit in which is connected the totalizing voltmeter 143. In calibrating voltmeter 143, the amount of patent flour passing over the scale 20 per minute is read on ammeter 135. Supposing, on the basis of 300 pounds of wheat per minute input for the mill, the meter 135 reads 150 pounds per minute, then resistance 132 is adjusted to cause a corresponding voltage drop of 150 millivolts. Likewise ammeter 125 is read and supposing, on the same basis of infeed of wheat in the mill, that it reads 45 pounds per minute of first clear flour passing over scale 21, then resistance 122 is adjusted to cause a corresponding voltage drop of 45 millivolts. Likewise, supposing for scale 22 a reading of 30 pounds per minute for meter 138 is indicated, then resistance 133 is adjusted to a drop of 30 millivolts. By connecting resistances 132, 122 and 145 in series so that they add together, their total voltage of 225 is indicated by voltmeter 143 when it is calibrated by adjusting shunt 144. Therefore all the stock or flour amounting to a total of 225 pounds which is weighed by all three scales, is totalized and indicated by the graphically recording voltmeter 143. In short, by shunt 144, the recording pen may be adjusted to register with the figure 225 on the chart carried by the meter. Thus this 225 figure represents the yield of flour from the wheat in terms of pounds per minute.

It may be desired to know what the percentage of yield of the flour is with reference to the input of wheat into the mill, i. e., it may be desired to have the voltmeter 143 indicate the percentage of yield of flour rather than physical or pound yield. This may be done by means of the additional shunt 141. In place of the pound, the chart indicating pounds would be removed from the meter 143 and a chart indicating percentages would be substituted, and then by means of shunt 141 the pen would be adjusted to make the pen coincide with the line indicating 75 percent on the chart. In this wise the total percentage of yield of flour over the three scales 20, 21 and 22 would be totalized and indicated. The figure 75 percent was derived above by determining what percent the total percentage of 225 pounds is of the input 300 pounds.

Ordinarily the mill will have a normal input per minute of wheat for operation, as for example in the above 300 pounds per minute was taken. If it is desired for a period to have a change of input of wheat into the mill from 300 pounds to 350 pounds per minute, then to learn what the yield in pounds is it would only be necessary to supply voltmeter 143 with the chart indicating the flow per minute in terms of pounds, as explained above when the same read 225 pounds per minute. If the percentage of yield was the same, then of course the new reading would be 262.5 pounds per minute. Next, if it is desired to have the voltmeter 143 indicate the yield in percentage per minute on the new basis of 350 pounds per minute input, then the following adjustment would be made: A chart indicating percentage would be substituted for the yield in terms of pounds chart. Then shunt 144 would be left unmoved, but shunt 141 would be adjusted to reduce the voltage so that the percentage of yield for 300 pounds would also be the percentage of yield for the 350 pounds of wheat. In short, the shunt 141 would be adjusted to cause the recording pen to register with the line on the chart indicating 75 percent. Thereupon the voltmeter would be adjusted to indicate percentage of yield for all three scales on the basis of 350 pounds input of wheat per minute instead of 300 pounds. As a matter of actual practice, shunt 141 is calibrated to indicate the various amounts of input which are normally encountered.

The scales 23, 24 and 25 weighing the offal products, i. e., the bran, shorts and red dog respectively, and their circuits and recording means, are similar in construction and mode of operation to those set forth in connection with the flour scales 20, 21 and 22. Hence, in the interest of brevity, such description will not be repeated.

In connection with the totalizing of the yield of the offal, as well as in the case of computing the yield of the flour, it is to be remembered that there is what is known in the trade as "invisible" loss due to the loss of moisture, loss of material in the form of dust, and other losses, and these are considered in arriving at the figures given for yield as above set forth. However, the miller of flour must in the case of offal take into account the fact that there is a greater evaporation than in the case of flour. The offal is subject to more extended grinding and it is to be remembered that grinding is a heat-producing process so that it is exposed to greater evaporation losses. Also in cooling the offal there is many times the weight of air employed as compared to that used in connection with the flour, and so a greater percentage of the offal is subject to being carried away as dust.

Figure 5:
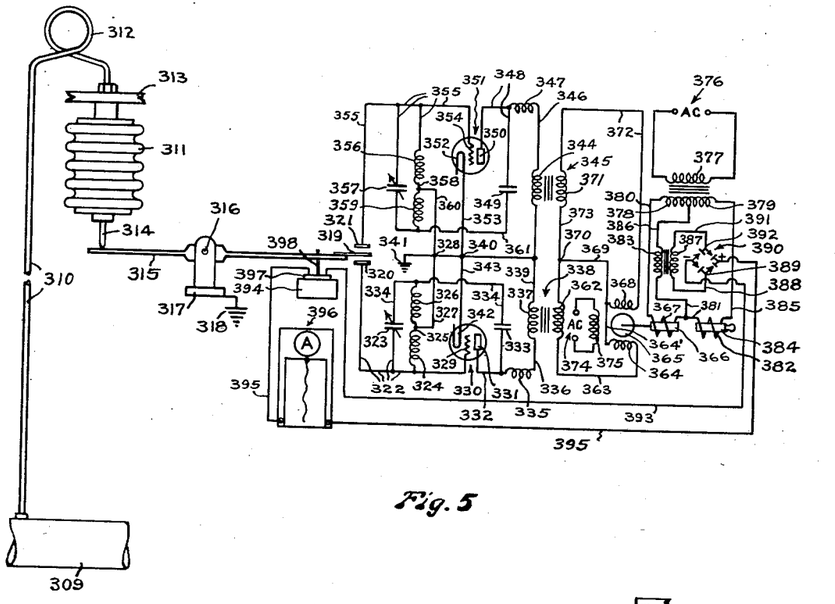
Fig. 5 is a view of a modified form of our invention in elevation and of the associated circuit illustrating an application of our invention to metering a force developed by fluid pressure or by temperature.

A modified form of our invention illustrated in Fig. 5 illustrates an adaptation to determine a force in the form of pressure. A pressure which may be in the form of steam, air, or water occurring, for example, in a means such as a pipe 309 may be connected by pipe 310 with any standard pressure reflecting means, for example, the bellows means 311. Pipe 310 is preferably provided with a loop 312 as eliminator of moisture or surges. The pressure means 311 may be fixedly mounted to a hanger 313 and said pressure means preferably has contact member 314. The contacting member 314 is disposed to balance against a scale beam 315 pivotally mounted at 316 on fulcrum means 317 which may be grounded at 318. One end of scale arm 315 is provided with a condenser plate 319 operatively disposed in null position between condenser plates 320 and 321.

In this modified form of our invention the control circuit may be similar to that described for scale 21. The parts of said control circuit herein are as follows: Condenser plate 320 is connected by conductor 322 on one side of variable condenser 323. Also, conductor 322 is connected to inductance coil 324, which in turn is joined by conductor 325 to inductance coil 326, said coils being inductively related. Conductor 327 connects conductor 325 to junction point 328. Also, conductor 322 is connected to grid 329 of tube 330. Tube plate 331 is connected by conductor 332 to one side of condenser 333 while the other side is connected by conductor 334 to inductance coil 326 and to the other side of condenser 323. Conductor 332 is also connected to choke coil 335 which is connected by conductor 336 to secondary winding 337 of transformer 338. Secondary winding 337 is connected by conductor 339 to junction 340 and 328 to ground 341. Junction 340 is joined to cathode 342 by conductor 343. Conductor 339 extends to secondary winding 344 of transformer 345. Conductor 346 joins winding 344 to choke coil 347 which is connected by conductor 348 to one side of condenser 349 and to plate 350 of tube 351, the cathode 352 of which is joined by conductor 353 to junction 340. Grid 354 is joined by conductor 355 to inductance coil 356 and to one side of variable condenser 357 and also to plate 321. Coil 356 is joined by conductor 358 to inductance coil 359, said coils being inductively related. Conductor 358 is joined by conductor 360 to junction 328. The other side of condenser 349 is connected by conductor 361 to inductance coil 359 and variable condenser 357. Primary winding 362 of transformer 338 is connected by conductor 363 to one of the secondary windings 364 of a reversible type of motor 365 hereinafter described, also, secondary winding 364 is joined by conductor 364' to secondary winding 368.

Motor 365 is operatively connected through speed reduction gearing, screw and yoke as for scale 21 to core 366 of solenoid coil 367, said motor forming a linking means between the control circuit and the regulating power circuit hereafter described. The other secondary winding 368 of said motor 365 is connected by conductor 369 to junction 370 and to primary winding 371 by conductor 372. Primary winding 371 is connected by conductor 373 to junction 370 and to primary winding 362. An alternating current with source 374 is impressed upon primary winding 375 of motor 365.

A regulating power circuit for this modified form of our invention is similar to that provided for scale 21 is provided as follows: An alternating current supply with source 376 is connected to the primary transformer winding 377 which is inductively disposed with respect to secondary winding formed of two components 378 and 379. Conductor 380 connects winding 378 to solenoid coil 367 in which is movable core 366 connected to motor 365 for moving said core 366 in and out of the coil 367. Solenoid coil 367 is connected by conductor 381 to solenoid coil 382 and transformer primary 383. In solenoid coil 382 is an adjustably disposed core 384 which is not connected to motor 365 for movement in and out of its solenoid coil, but is adjusted to effect a balance between the circuits in which said solenoids 367 and 382 are located. Solenoid 382 is connected to the secondary winding 379 by conductor 385. Primary winding 383 is connected by conductor 386 to an intermediate point of secondary winding formed of the two components 378 and 379. Secondary winding 387 is connected by conductor 388 to one alternating current terminal 389 of a rectifier 390. Secondary winding 387 is also connected by conductor 391 to the other alternating current terminal 392 of the rectifier 390. Conductor 393 connects negative terminal of the rectifier 390 to one movable element 397 of a polarized magnetic balancing means or unit 394. The movable element 397 is suspended from scale means 315 by wire 398. Conductor 395 connects the other terminal of the movable element 397 of unit 394 to the positive terminal of the rectifier 390 through the recording meter 396.

The mode of operation of the modified form of the invention shown in Fig. 5 is indicated in the above description. As pressure increases in 309 it would be communicated through conduit 310 to means 311 and cause contacting member 314 to act through scale beam 315 to move condenser plate 319 nearer to condenser plate 321 thereby unbalancing the circuits so that motor 365 would be operated to increase the electromagnetic effect of unit 394 to restore plate 319 to null position after the manner hereinbefore explained in connection with scale 21. The control and regulating power circuit provide for a restoring electromagnetic force directly proportional to the pressure being exerted by pressure means 311 which force is recorded on meter 396 the recording means being illustrated in the form of a graphic chart. Thus again we have an application wherein the scale beam is maintained in null position by an electromagnetic force directly proportional by the registering current which in turn is directly proportional to the pressure being metered.

Figure 6:
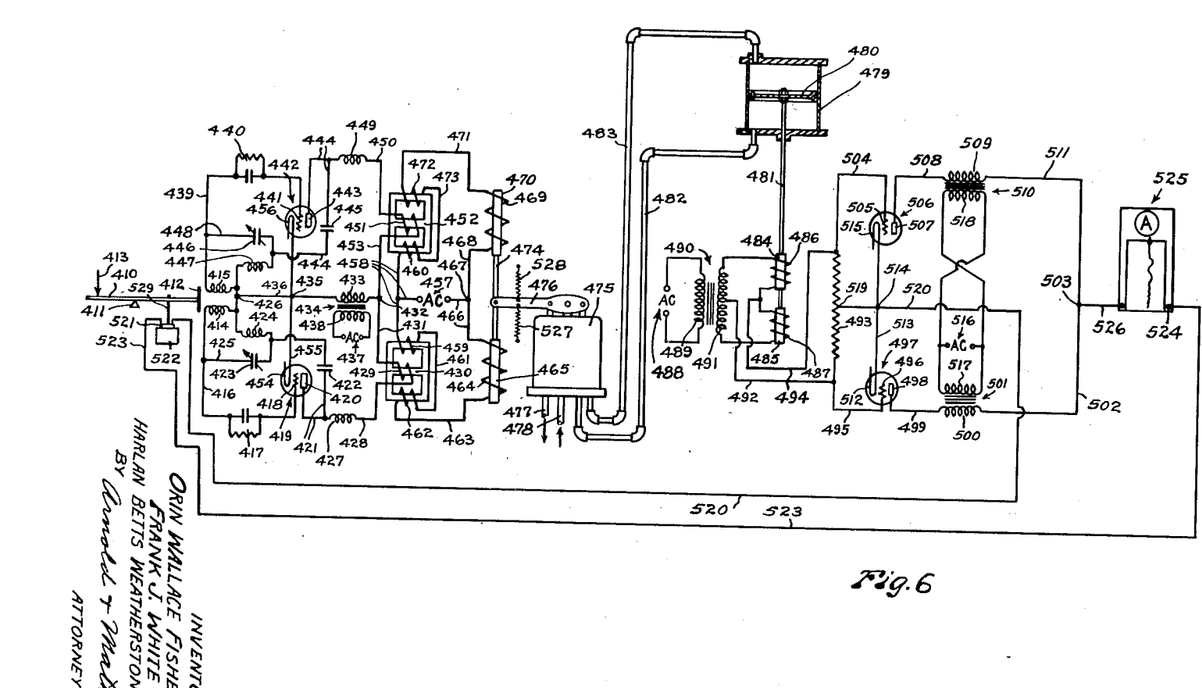
Fig. 6 is a view of a modified form of our invention as respects the control and regulating power circuit and illustrating a modified form of actuating means linking the control and regulating power circuit.

Fig. 6 is a view of a modified form of control and regulating power circuit which are linked together by a pressure means operated by air or liquid means as a modified form of linking means between the two circuits and also including other variations in the circuit. A scale beam 410 having a fulcrum 411 has a metal plate 412 mounted on one end thereof. The force or weight may be applied at 413. Plate 412 is in operative position with inductive coils 414 and 415. When plate 412 is in null position with respect to said coils then the current flowing in these coils is in balanced relation. In place of condenser plates, as plates 34 and 35 in the control circuit, as described above for scale 21, I have preferably used balanced induction coils 414 and 415, in this modified form of my invention which are symmetrically positioned with respect to plate 412 when the beam 410 is in null position. These coils form part of balanced components of the control circuit. In the condenser plate construction, there obtains an electrostatic stress that tends to interfere with refined weighing in installations where an exceedingly high degree of accuracy is required in proportion to the weights involved. Where relatively larger weights are involved such electrostatic stress is proportionately so small that it may be practically ignored because it is relatively inconsequential.

Coils 414 and 415 form part of balanced components of the control circuit. Coil 414 is connected by conductor 416 through grid leak and condenser 417 to the grid 418 of tube 419. Plate 420 is connected by conductor 421 through condenser 422 to variable condenser 423 and coil 424. Conductor 425 joins condenser 423 and coil 424 to induction coil 414 and junction 426. Conductor 421 is connected to choke coil 427 which in turn is connected by conductor 428 to winding 429 of a saturable core reactor 430. Winding 429 is connected by conductor 431 to junction 432 which is connected to the secondary winding 433 of transformer 434 which winding is in turn connected to junction 435 and to junction point 426 by conductor 436. An alternating current with a source 437 energizes primary winding 438 of transformer 434. Induction coil 415 is joined by conductor 439 through grid leak and condenser 440 to grid 441 of tube 442. Plate 443 is joined by conductor 444 through condenser 445 to variable condenser 446 and to coil 447. Condenser 446 and coil 447 are joined by conductor 448 to coil 415 and junction 426. Choke coil 449 is connected to conductor 444. Also said coil is connected by conductor 450 to winding 451 of a saturable reactor 452. Winding 451 is connected by conductor 453 to junction 432. Cathode 454 of tube 419 is joined by conductor 455 to junction point 435 and to cathode 456 of tube 442.

An alternating current with source at 457 is joined by conductor 458 to winding 459 of the saturable reactor 430. Conductor 458 also is connected to winding 460 of saturable reactor 452. Winding 459 is joined by conductor 461 to winding 462 which in turn is connected by conductor 463 to solenoid winding 464, said solenoid having core 465. Said solenoid is also joined by conductor 466 to junction 467 and the alternating current source 457. Junction 467 is joined by a conductor 468 to solenoid winding 469 having core 470. Winding 469 is also joined by conductor 471 to winding 472 which in turn is joined by conductor 473 to winding 460. Link 474 connects core 465 with core 470. A four-way pressure control valve 475 with neutral position has a valve operating lever 476 which in turn is pivotally connected to link 474. Said four-way valve has fluid means outlet 477 and inlet means 478.

One end of cylinder 479 having piston 480 mounted on piston rod 481 is connected by conduit 482 to said four-way valve means 475. The other end of cylinder 479 is also connected by conduit 483 to said four-way valve means 475. Piston rod 481 has mounted thereon solenoid cores 484 and 485, said cores operating in solenoid coils 486 and 487 of a regulating power circuit next to be described.

An alternating current with source at 488 is connected to primary winding 489 of transformer 490. The mid point of secondary winding 491 of transformer 490 is joined by conductor 492 to resistance 493 which in turn is joined by conductor 494 to solenoid coils 486 and 487. Conductor 495 joins conductor 492 to grid 496 of tube 497, the plate 498 of which tube is joined by conductor 499 to the secondary winding 500 of transformer 501 which winding in turn is connected by conductor 502 to junction 503.

Conductor 504 joins conductor 494 to grid 505 of tube 506, the plate 507 of which tube is joined by conductor 508 to a secondary winding 509 of transformer 510. Said winding in turn is connected by conductor 511 to junction point 503. The cathode 512 of tube 497 is joined by conductor 513 to junction 514 and to cathode 515 of tube 506. An alternating current with source at 516 has leads to primary winding 517 of transformer 501 and to primary winding 518 of transformer 510. The midway point 519 of resistance 493 is joined to junction 514 by conductor 520 which also extends to the movable element 521 of a polarized magnetic means 522. The other side of said movable element is joined by conductor 523 to one terminal 524 of a recording means 525. The other terminal of which means is joined by conductor 526 to junction point 503. Spring means 527 and 528 operate to urge valve operating lever 476 to neutral position. The magnetic movable means 521 is suspended by link 529 from scale beam 410.

The mode of operation of this modified form of circuit will be manifest from the above description.

By means of the reactors of the saturable core reactors 430 and 452 a force of sufficient magnitude is readily provided for operating the lever 476 of the four-way pressure control valve 475. Thus, if plate 412 mounted on scale beam 410 is moved from null position it will unbalance the otherwise balanced components of the control circuit and thereby cause said reactors 430 and 452 through solenoids cores 465 and 470 to actuate the lever 476 from neutral position so that the fluid pressure will be admitted to one end or the other of cylinder 479. As piston 480 moves up or down it moves core members 484 and 485 thereby providing for a phased shift in the grids 496 and 505. This in turn will cause greater or less current to flow in conductor 520 to the movable element 521 of the polarized magnetic means 522 thereby operating to increase or decrease the current flowing in conductor 520 which increases or decreases the energizing of the electromagnet of the movable element 521 which thereby provides a restoring force to reposition plate 412 in null position. This restoring force is directly proportional to the force dislodging the plate 412 from null position.

Figure 7:
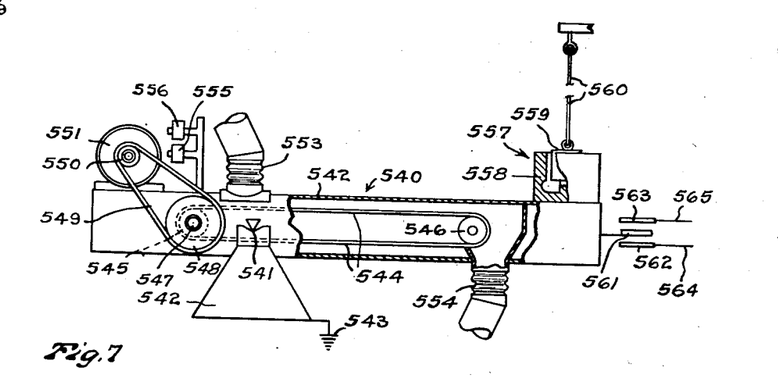
Fig. 7 is a view of a modified form of a scale beam in which a conveyor belt may be employed in our invention as the conveying means with parts broken away.

In the modified form of scale beam Fig. 7 illustrating in general a scale beam in which a conveyor belt is employed as a conveying means in place of a screw conveyor, a scale beam 540 is mounted on fulcrum 541 having base 542 grounded at 543. A conveyor belt means 544 is operatively disposed within the scale beam 540 mounted on pulleys 545 and 546—said pulley 545 being mounted on shaft 547. On the end of shaft 547 is mounted a driving pulley 548 which is connected with pulley 550 of constant speed motor 551. In the housing 552 of the scale beam 540 a bellowed inlet 553 for the admission of material to be weighed is preferably located in the vertical axis of the fulcrum to eliminate disturbances upon the scale beam by any force of impingement of material upon the belt 544. For the discharge of material from said conveyor a bellowed outlet 554 is provided. A counterbalance 555 is attached to said housing 552 for mechanically balancing the beam when there is no material flowing through said beam, that is, for bringing the scale beam into null position. A second counterbalance 556 is provided for mechanically check weighing material while in the act of flowing through the scale beam 540 on belt 544. Also mounted on said housing is a polarized magnetic balancing means 557 of dynamic loud speaker type which preferably may have one element 558 in the form of a permanent magnet. A second element 559, as an electromagnet, of the polarized magnetic balancing means 557, is operatively disposed with respect to said first magnetic element 558 preferably by suspending the same by wire 560 so that the two elements 558 and 559 will be physically independent of each other and freely mounted without any physical contact between them to produce friction when relative movement occurs therebetween. Scale beam 540 carries or is connected to condenser plate 561 disposed in null position when the scale beam is in balance between condenser plates 562 and 563 which have conductors 564 and 565 connecting said plates respectively to a control circuit which may be the same as that described for scale 21 hereinabove set forth and which control circuit may in turn have the same linking means, that is, in the form of a motor and the same regulating power circuit and associated mechanism as described for scale 21 or it may have any one of the other modified forms of control and regulating circuit and linking means herein described.

The mode of operation of this modified form of scale beam will be manifest from the description above given. The belt 544 provides for a constant speed of flow for the stream of material moving through the scale beam 540. Certain materials in the case of a screw conveyor, as shown in scale 21, may have some tendency to slip or pile up so that any criticism that may be raised on that point would be eliminated by the use of the belt conveyor 544.

The modified forms shown above of our invention illustrate various applications of our invention and modifications due to particular environments and refined conditions in which our invention may be used.

The above sets forth the preferred forms of embodiment of our invention.

We claim:

1. In a scale for weighing and recording continuously varying weights, as material on a conveyor means, a scale beam responsive to varying weights of material on the conveyor means; control circuit means having a variable output; control means proportionately responsive to variations from null position of said scale beam and determining the output of said control circuit means comprising a movable means responsive to movement of said balance beam, and a fixed means positioned in spaced relation to said movable means, said movable and fixed means providing variable electrical values therebetween upon variable space therebetween; electro magnetic balance beam maintaining means for maintaining said balance beam in null position and opposing any load tending to move the balance beam out of null position, comprising a core member and a spaced coil member, one of which is fixed and the other of which is movable with said scale beam; power circuit means having a variable output and connected with said maintaining means; control means for said power circuit means comprising variable electrical control means disposed in said power circuit, movable mechanical means for said power control means, and electrically operable moving means for said mechanical means disposed in said control circuit means; and electric recording means, disposed in said power circuit means, responsive to the electrical energy in said power circuit means, and calibrated to indicate and record weight units.

2. In a scale for weighing and recording continuously varying weights, as material on a conveyor means, a scale beam responsive to varying weights of material on the conveyor means; control circuit means having a variable output; control means proportionately responsive to variations from null position of said scale beam and determining the output of said control circuit means comprising a movable means responsive to movement of said balance beam, and a fixed means positioned in spaced relation to said movable means, said movable and fixed means forming a variable condenser and providing variable electrical values therebetween upon variable space therebetween; electro magnetic balance beam maintaining means for maintaining said balance beam in null position and opposing any load tending to move the balance beam out of null position, comprising a core member and a spaced coil member, one of which is fixed and the other of which is movable with said scale beam; power circuit means having a variable output and connected with said maintaining means; control means for said power circuit means comprising variable electrical control means disposed in said power circuit, movable mechanical means for said power control means, and electrically operable moving means for said mechanical means disposed in said control circuit means; and electric recording means, disposed in said power circuit means, responsive to the electrical energy in said power circuit means, and calibrated to indicate and record weight units.

3. In a scale for weighing and recording continuously varying weights, as material on a conveyor means, a scale beam responsive to varying weights of material on the conveyor means; control circuit means having a variable output; control means proportionately responsive to variations from null position of said scale beam and determining the output of said control circuit means comprising a movable means responsive to movement of said balance beam, and a fixed means positioned in spaced relation to said movable means, said movable and fixed means being inductively related and providing variable electrical values therebetween upon variable space therebetween; electro magnetic balance beam maintaining means for maintaining said balance beam in null position and opposing any load tending to move the balance beam out of null position, comprising a core member and a spaced coil member, one of which is fixed and the other of which is movable with said scale beam; power circuit means having a variable output and connected with said maintaining means; control means for said power circuit means comprising variable electrical control means disposed in said power circuit, movable mechanical means for said power control means, and electrically operable moving means for said mechanical means disposed in said control circuit means; and electric recording means, disposed in said power circuit means, responsive to the electrical energy in said power circuit means, and calibrated to indicate and record weight units.

4. In a scale for weighing and recording continuously varying weights, as material on a conveyor means, a scale beam responsive to varying weights of material on the conveyor means; control circuit means having a variable output; control means proportionately responsive to variations from null position of said scale beam and determining the output of said control circuit means comprising a movable means responsive to movement of said balance beam, and a fixed means positioned in spaced relation to said movable means, said movable and fixed means providing variable electrical values therebetween upon variable space therebetween; electro magnetic balance beam maintaining means for maintaining said balance beam in null position and opposing any load tending to move the balance beam out of null position, comprising a core member and a spaced polarized coil member, one of which is fixed and the other of which is movable with said scale beam, whereby the magnetic pull and the operating current of said maintaining means are directly proportional; power circuit means having a variable output and connected with said maintaining means; control means for said power circuit means comprising variable electrical control means disposed in said power circuit, movable mechanical means for said power control means, and electrically operable moving means for said mechanical means disposed in said control circuit means; and electric recording means, disposed in said power circuit means, responsive to the electrical energy in said power circuit means, and calibrated to indicate and record weight units.

5. In a scale for weighing and recording continuously varying weights, as material on a conveyor means, a scale beam responsive to varying weights of material on the conveyor means; control circuit means having a variable output; control means proportionately responsive to variations from null position of said scale beam and determining the output of said control circuit means comprising a movable means responsive to movement of said balance beam, and a fixed means positioned in spaced relation to said movable means, said movable and fixed means providing variable electrical values therebetween upon variable space therebetween; electro magnetic balance beam maintaining means for maintaining said balance beam in null position and opposing any load teding to move the balance beam out of null position, comprising a core member and a spaced coil member, one of which is fixed and the other of which is movable with said scale beam; power circuit means having a variable output and connected with said maintaining means and having a zero output when the scale beam is at null position and subject to no weight load condition; control means for said power circuit means comprising variable electrical control means disposed in said power circuit, movable mechanical means for said power control means, and electrically operable moving means for said mechanical means disposed in said control circuit means; and electric recording means, disposed in said power circuit means, responsive to the electrical energy in said power circuit means, and calibrated to indicate and record weight units.

6. In a scale for weighing and recording continuously varying weights, as material on a conveyor means, a scale beam responsive to varying weights of material on the conveyor means; control circuit means having a variable output; control means proportionately responsive to variations from null position of said scale beam and determining the output of said control circuit means comprising a movable means responsive to movement of said balance beam, and a fixed means positioned in spaced relation to said movable means, said movable and fixed means providing variable electrical values therebetween upon variable space therebetween; electro magnetic balance beam maintaining means for maintaining said balance beam in null position and opposing any load tending to move the balance beam out of null position, comprising a core member and a spaced coil member, one of which is fixed and the other of which is movable with said scale beam; power circuit means having a variable output and connected with said maintaining means; control means for said power circuit means comprising variable solenoid coil means disposed in said power circuit, movable mechanical means for said solenoid coil means, and electrically operable moving means for said mechanical means disposed in said control circuit means; and electric recording means, disposed in said power circuit means, responsive to the electrical energy in said power circuit means, and calibrated to indicate and record weight units.

ORIN WALLACE FISHER.
FRANK J. WHITE.
HARLAN BETTS WEATHERSTONE.